Sept. 25, 1951 P. ROETTINGER ET AL 2,569,074
SAUCER
Filed April 9, 1948

INVENTORS
PHILIP ROETTINGER
PHILIP ROETTINGER, Jr.
BY
ATTORNEY

Patented Sept. 25, 1951

2,569,074

UNITED STATES PATENT OFFICE 2,569,074

SAUCER

Philip Roettinger and Philip Roettinger, Jr.,
St. Albans, N. Y.

Application April 9, 1948, Serial No. 20,034

1 Claim. (Cl. 65—15)

This invention relates to saucers.

It is an object of the present invention to provide a supplemental saucer on which a coffee cup may be rested and which will serve to receive the overflow of coffee or the like from the cup in such a manner that it will confine the coffee and prevent the bottom of the cup from having actual contact with the same when the coffee is lying in the bottom of the saucer.

Another object of the present invention is to provide a supplemental saucer adapted to be placed in standard saucers, which is of simple construction, inexpensive to manufacture, easy to dispose in the saucer, convenient to use and efficient in operation.

For other objects and for a better understanding of the invention, reference may be had to the following detailed description taken in connection with the accompanying drawing, in which Fig. 1 is a top plan view of the supplemental saucer embodying the features of the present invention.

Figure 1:
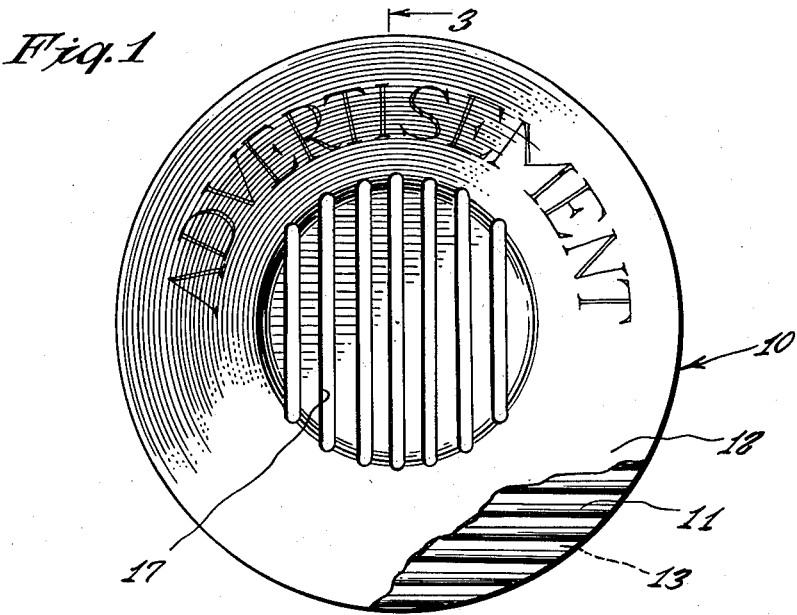
Figure 2:
Fig. 2 is a side elevational view of the supplemental saucer.
Figure 3:
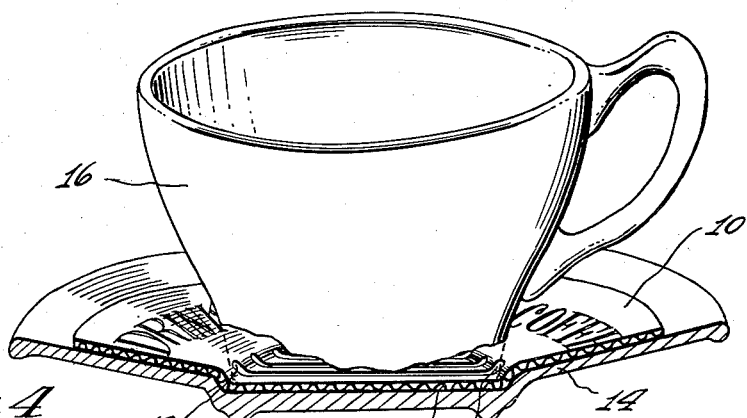
Fig. 3 is a sectional view, in elevation, taken on line 3—3 of Fig. 1 through the saucer with portions of the cup broken away and through the main saucer supporting the supplemental saucer and the cup.
Figure 4:
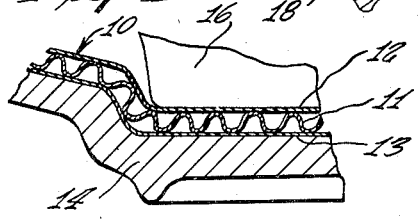
Fig. 4 is an enlarged fragmentary and sectional view of the assembly of the main saucer, supplemental saucer, and cup.

Referring now to the figures, 10 represents the supplemental saucer embodying the features of the present invention. This saucer is formed of paper or cardboard having an intermediate layer of corrugations 11. This layer of corrugations 11 is disposed between upper and lower plain layers 12 and 13. This supplemental saucer is pressed and shaped to fit the natural bottom of a main saucer 14. The supplemental saucer is dished in the same manner as the main saucer 14. A cup 16 is rested on the center of the saucer element 10 and in the bottom of the main saucer 14.

The bottom of the saucer element 10 is provided with a series of elongated openings 17 through which the coffee can pass to the bottom of the saucer 14. These openings will contain a considerable amount of the coffee and at the same time the coffee will pass through the corrugations 11 and over the entire bottom of the saucer without the bottom of the cup actually having to rest in the coffee. The ends of the openings extend into the raised periphery of the bottom of the saucer element 10 as indicated at 18 so that the coffee will enter the openings before passing down into the bottom of the saucer element 10.

Any overflow from the cup will pass downwardly along the outer surface of the cup and will be directed to the bottom thereof and upon the saucepan 10 before entering the openings 18 and will pass immediately to the openings for collection into the space in the main saucer 14.

The supplemental saucer 10 is accordingly formed of inexpensive material and can be disposed of after it has once been used. Advertising matter may be placed on the upper layer 12 of the saucer and as well on the bottom layer 13. The saucer element 10 can be shaped simultaneously with the cutting of the openings 17.

While various changes may be made in the detail construction, it shall be understood that such changes shall be within the spirit and scope of the present invention as defined in the appended claim.

It is to be observed that the elongated openings 17 further serve to prevent skidding between the bottom of cup 16 and the upper central layer 12 of the saucer 10. This feature prevents slipping, skidding and movement of the cup when in transit which might lead to accidental burning on the part of the waiter or user.

We claim:

A supplemental saucer element adapted to fit the bottom of a main saucer comprising top and bottom layers of paper material, and a corrugated intermediate portion for retaining the layers spaced with respect to one another, said element comprising a depressed portion having sides, said depressed portion having elongated openings extending across the same and upwardly into the sides of the portion for receiving portions of the spilled liquid, the corrugations of the spacing material extending transverse to the elongated openings.

PHILIP ROETTINGER.
PHILIP ROETTINGER, JR.

REFERENCES CITED

The following references are of record in the file of this patent:

UNITED STATES PATENTS

| Number | Name | Date |
|---|---|---|
| 1,154,036 | Lydon | Sept. 21, 1915 |
| 1,359,056 | Gregory | Nov. 16, 1920 |

FOREIGN PATENTS

| Number | Country | Date |
|---|---|---|
| 16,389 | Great Britain | Sept. 2, 1895 |
| 240 | Great Britain | Jan. 3, 1906 |
| 364,650 | Great Britain | Jan. 4, 1932 |
| 44,829 | Germany | Oct. 2, 1888 |
| 177,375 | Germany | Oct. 27, 1906 |
| 10,650 | Switzerland | July 26, 1895 |